US006600747B1

(12) United States Patent
Sauber

(10) Patent No.: US 6,600,747 B1
(45) Date of Patent: Jul. 29, 2003

(54) VIDEO MONITOR MULTIPLEXING CIRCUIT

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/156,085

(22) Filed: Sep. 17, 1998

(51) Int. Cl.[7] .................................................. H04L 12/28

(52) U.S. Cl. .................. 370/395.64; 370/465; 370/539; 345/761

(58) Field of Search ................................ 370/532, 537, 370/395.1, 395.64, 465, 466, 539; 345/707, 761, 180, 11

(56) References Cited

U.S. PATENT DOCUMENTS

| | | | | |
|---|---|---|---|---|
| 3,840,702 A | | 10/1974 | Woods | 179/1 SW |
| 5,077,542 A | | 12/1991 | Lanoiselee | 332/151 |
| 5,137,022 A | | 8/1992 | Henry | 128/419 PT |
| 5,168,273 A | | 12/1992 | Solomon | 340/870.05 |
| 5,311,295 A | | 5/1994 | Tallman et al. | 348/180 |
| 5,319,305 A | | 6/1994 | Baba | 324/115 |
| 5,528,309 A | | 6/1996 | Nguyen | 348/587 |
| 6,223,283 B1 | * | 4/2001 | Chaiken et al. | 713/1 |
| 6,373,476 B1 | * | 4/2002 | Dalgleish et al. | 345/204 |

OTHER PUBLICATIONS

National Semiconductor, "DS90C363/DS90CF364 +3.3V Programmable LVDS Transmitter 18–Bit Flat Panel Display (FPD) Link—65 MHz +3.3V LVDS Receiver 18–Bit Flat Panel Display (FPD) Link—65 MHz", www.national.com, pp. 1–14, Jul. 1997.

* cited by examiner

*Primary Examiner*—Alpus H. Hsu
*Assistant Examiner*—Thien D Tran
(74) *Attorney, Agent, or Firm*—Baker Botts L.L.P.

(57) ABSTRACT

A single group of signals interfaces a computer system to either an analog display or a digital display. A video signal in digital format and a video signal in analog format are both supplied to a circuit that multiplexes the digital signal and the analog signal, generating an appropriate output signal for the display, either analog or digital, that is coupled to the computer system. In one example, the signal connector interfaces the computer system to either an analog CRT display or a digital FPD display. The multiplexer multiplexes the analog signal and the digital signal supplied by the computer system and generates an output signal that is suitable for the CRT display or the FPD display, depending on the type of display coupled to the computer system.

23 Claims, 6 Drawing Sheets

VIDEO MONITOR MULTIPLEXING CIRCUIT

BACKGROUND

1. Field of the Invention

The present invention relates to interfaces between computers and video monitors, and more particularly to an interface that multiplexes analog and digital signals for the purpose of using one set of lines between a computer system and either an analog monitor or a digital monitor.

2. Description of the Related Art

The substantial growth of the personal computer is due, in part, to the technological breakthroughs in computer design. A typical personal computer system available today includes a plethora of peripheral devices undreamed of in years past. Today a computer system available to a typical consumer might include a system processor, associated memory and control logic, and a number of peripheral devices, including a display monitor, a keyboard, a mouse-type input device, floppy and hard disk drives, CD-ROM drives, a laser printer, a color scanner, a modem, network capabilities and even a voice recognition device.

An important peripheral available in a personal computer system is the video monitor. From the time of the television set to today's newer digital-type displays, technology has expanded the capabilities of video monitors. As a result of technological breakthroughs in video monitors, higher resolutions, faster refresh rates, and different types of video monitors are available at reasonable prices. One type of video monitor, the digital video monitor, has been improved upon and is becoming increasingly popular. A typical computer system may provide a connector for both digital and analog video monitors. What is needed is one set of lines that can connect either a digital or an analog video monitor to a computer system.

SUMMARY

A connector with a single set of signal lines interfaces a computer system to either an analog display or a digital display. A video signal in digital format and a video signal in analog format are both supplied to a circuit that multiplexes the digital signal and the analog signals, generating appropriate output signals for the display, either analog or digital, that are coupled to the computer system.

In one example, the set of signals interfaces the computer system to either an analog cathode ray tube (CRT) display or a digital flat panel display (FPD). The multiplexer multiplexes the analog signal and the digital signal supplied by the computer system and generates an output signal that is suitable for the CRT display or the FPD display, depending on the type of display coupled to the computer system.

In one embodiment of the present invention, an apparatus includes a video controller, a connector and a circuit coupled to the video controller and coupled to the connector, the circuit selectively coupling one of either an analog video signal and a digital video signal received from the video controller to a video monitor. In another embodiment, an apparatus includes a switch, a first input terminal coupled to the switch for receiving an analog signal, a second input terminal coupled to the switch, for receiving a differential digital signal, and an output terminal coupled to the switch, the switch for multiplexing the analog signal and the differential digital signal, and the output terminal for supplying a multiplexed signal. In a further embodiment, a computer system includes a processor, a video monitor coupled to the processor, a controller, and a circuit coupled to the video controller and coupled to the connector, the circuit selectively coupling one of either an analog video signal and a digital video signal received from the video controller to a video monitor.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of the invention and should not be taken to be limiting.

In a color display device such as an FPD or a CRT display, video display characteristics are typically provided by a Display Data Channel (DDC) signal upon power-up. A DDC monitor generally includes an Electrically Erasable Programmable Read Only Memory (EEPROM), which stores video display characteristics in a data format called Extended Display Identification Data (EDID) developed by VESA (Video Electronics Standards Association). The current EDID data format is described in Extended Display Identification Data Standard, Version 2, Revision 0, dated Apr. 9, 1996, the disclosure of which is expressly incorporated herein by reference.

Figure 1:
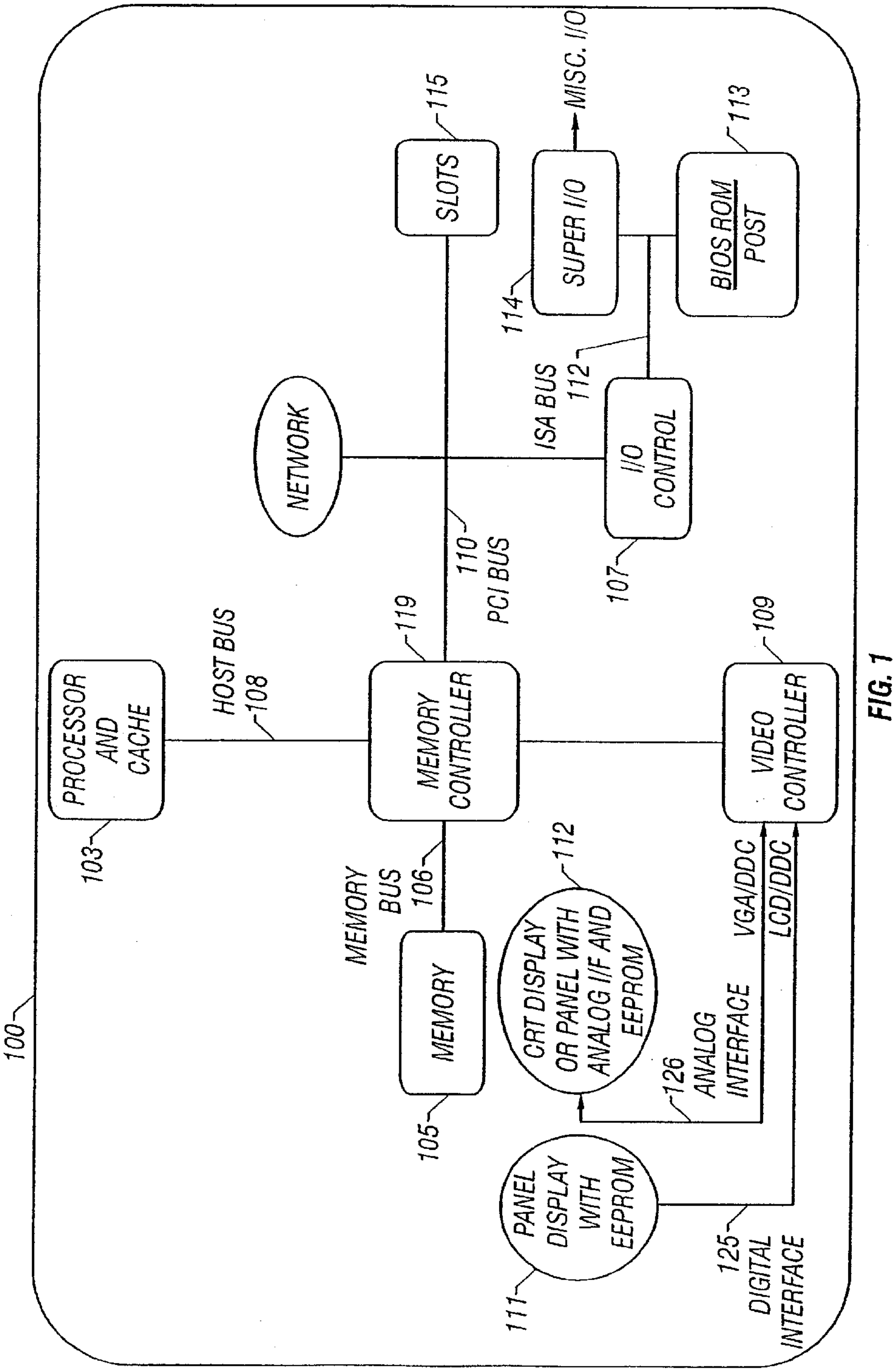
FIG. 1, labeled prior art, illustrates a conventional interface between a computer system and either an analog monitor or a digital monitor.

Referring to FIG. 1, a system block diagram of a computer system 100 is presented. This typical computer system 100 includes a processor and cache 103 electrically coupled to a memory controller 119 via a host bus 108. The memory controller 119 is further coupled to memory 105 through a memory bus 106. The memory controller 119 is further coupled to slots 115, video controller 109 and input/output control (I/O controller) 107 via a PCI (Peripheral Component Interconnect) bus 110. The I/O controller 107 is electrically coupled to a super input/output controller (Super I/O Controller) 114 and to Basic Input/Output System (BIOS) 113 through an ISA (Industry Standard Architecture) bus 112.

Upon startup of the computer system 100, the system Power On Self Test (POST) program, typically stored in BIOS Read Only Memory (ROM) 113, receives EDID information which is sent from an EEPROM located in a DDC monitor that includes either a panel display 111 or a CRT display 112 through the video controller 109 to the processor 103 of a computer system 100, which reads the information provided in an EDID format. The EDID format information is processed during system setup and the running of the POST program. The processor 103 interfaces with a video controller 109 which is programmed according to monitor characteristics.

Monitor characteristics and information in EDID format may include an identification code for the monitor defined by the system manufacturer. Once the computer system 100 obtains monitor identification information, the video controller 109 is programmed as directed by the stored characteristics of the coupled monitor.

The video controller 109 generally transmits both digital and analog signals. For a CRT 112, the video controller 109 transmits analog signals by first converting a digital video signal through a digital-to-analog converter (DAC), not expressly shown. For an FPD 111, the video controller 109 transmits digital signals without first converting the signal. In a typical desktop computer system 100, the video controller 109 is generally set up for a CRT display 112. In a typical notebook or laptop computer system the video controller 109 is generally set up for a digital FPD display 111.

For many years the only type of monitor used with desktop computer systems was the CRT. Currently, however, designers of desktop computer systems supply both CRT and FPD capable systems. One conventional technique, illustrated in FIG. 1, supports both FPD displays and CRT displays by supplying respective analog signals and digital signals to separate interfaces 125 and 126. The method is disadvantageous because the system 100 will have two sets of signal lines output from the video controller and two connectors.

Another method for providing both digital and analog signals to either a CRT or FPD display is to attach an analog-to-digital converter (ADC) at the input terminal of an analog interface on an FPD display. A problem with this method is that the additional conversion degrades the image quality of the video. Another problem with this method is that it adds additional cost to the system.

Figure 2:
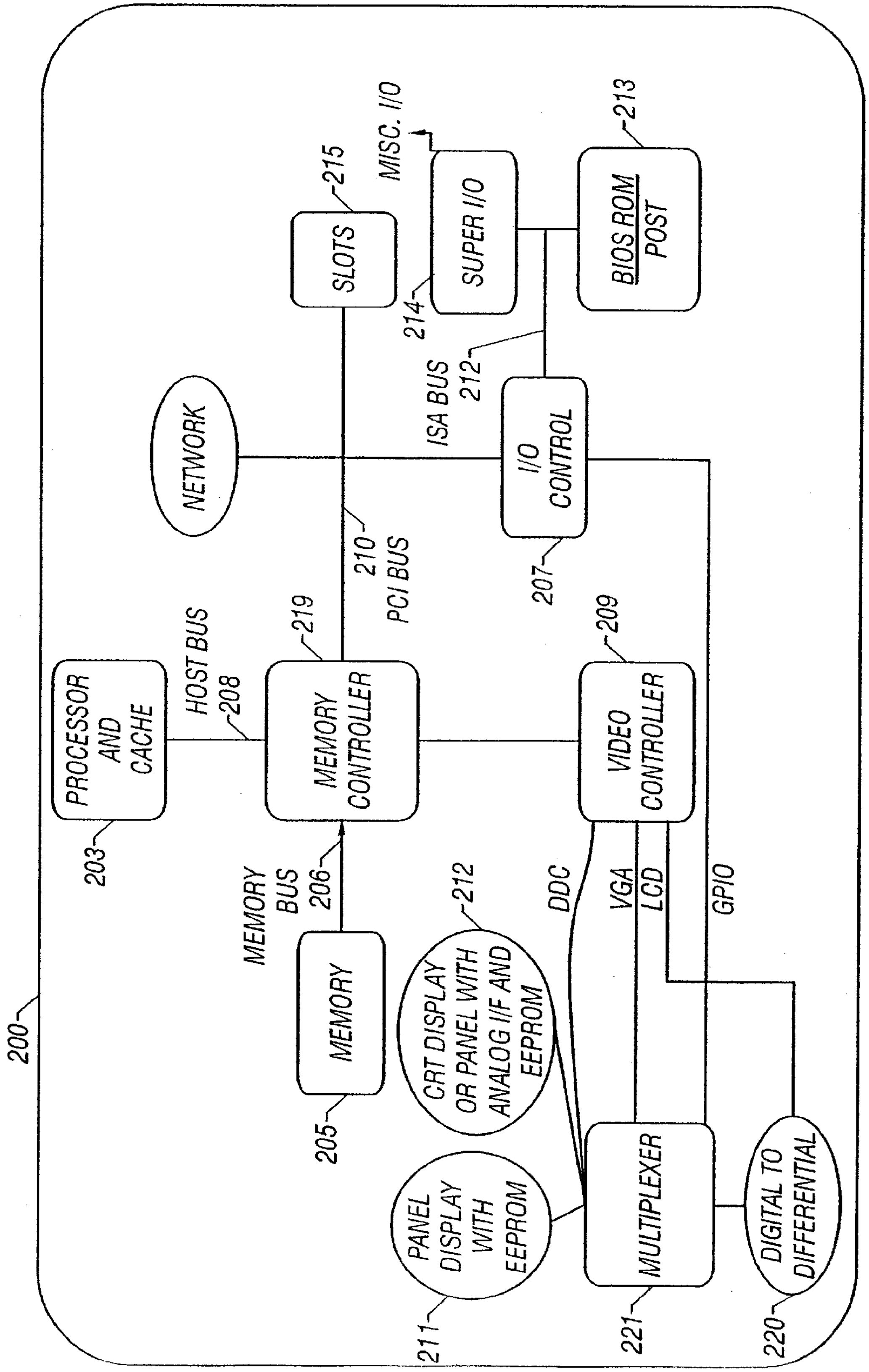
FIG. 2 is a block diagram illustrating a computer system including an interface between either an analog or a digital monitor and the rest of the computer system according to an embodiment of the present invention.

Referring to FIG. 2, a block diagram illustrates a computer system 200 in which a monitor selected from either an analog DDC monitor or a digital DDC monitor is coupled to the rest of the computer system 200. Like the computer system 100 shown in FIG. 1, the computer system 200 includes a CPU or system processor and cache 203 that is electrically coupled to a memory controller 219 through a host bus 208 and to memory 205 through the memory controller 219 and a memory bus 206. As in FIG. 1, the memory controller 219 is electrically coupled to a video controller 209 via a PCI bus 210. A video interface circuit including an analog multiplexer 221 and a digital to differential circuit 220 is electrically coupled to a video controller 209 and to a video monitor, either a digital video monitor 211 such as a FPD or an analog video monitor 212 such as a CRT display. The video controller 209 receives DDC signals from the video monitor. The multiplexer 221 and the digital to differential circuit 220 receive electrical signals from the video controller 209. The digital to differential circuit 220 may include a Low Voltage Differential Signaling (LVDS) transmitter or another suitable transmitter, such as a transmitter for Transition Minimized Differential Signaling (TMDS) based on PANELLINK technology developed by SILICON IMAGE, located in Palo Alto, Calif., or such as an optical transmitter. One type of LVDS transmitter that is suitable for usage with the computer system 200 is a DS90C363 integrated circuit manufactured by National Semiconductor, Inc.

Figure 4:
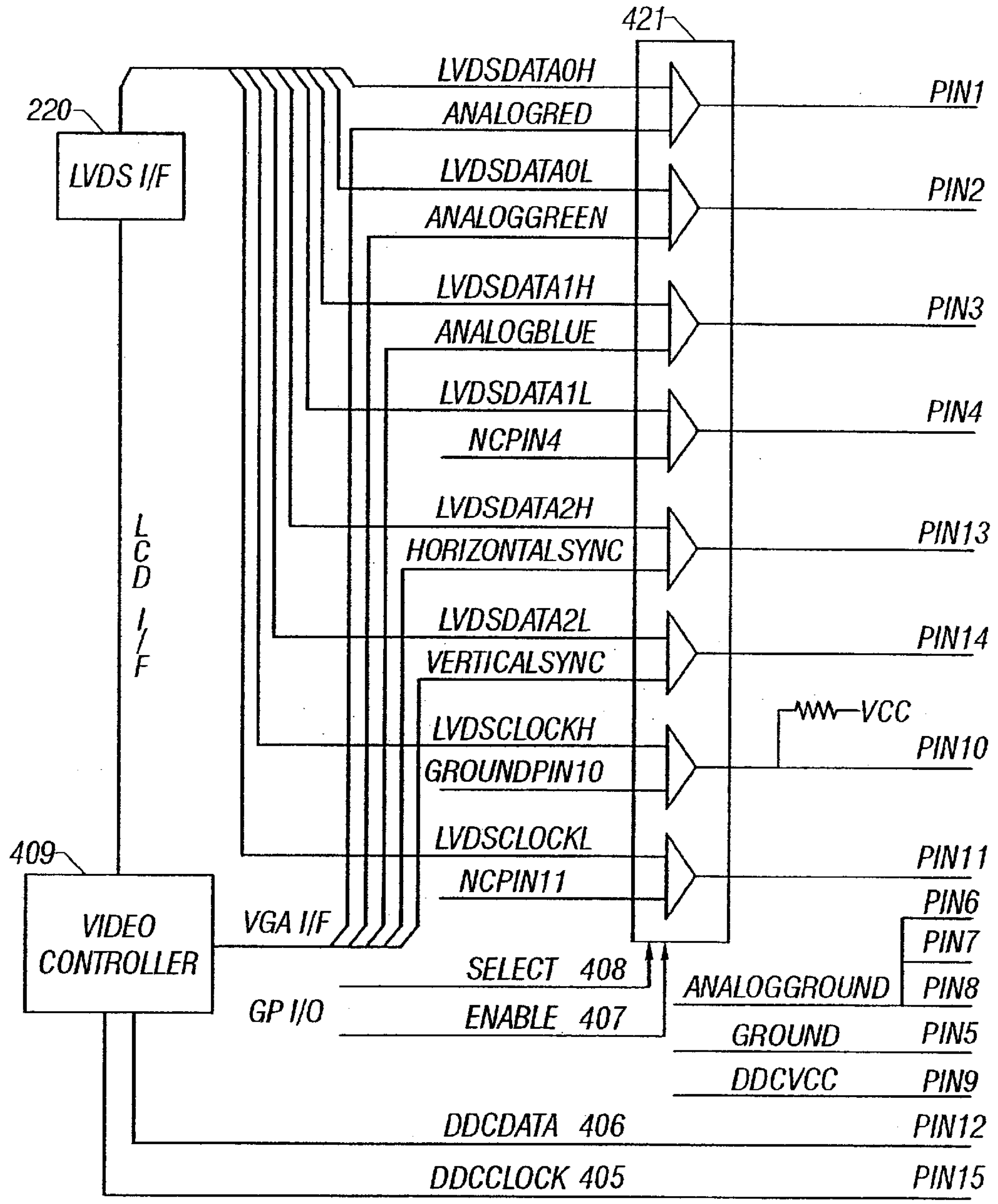
FIG. 4 is a schematic circuit diagram illustrating a circuit suitable for use as an interface between a computer system and either an analog or a digital monitor as shown in FIG. 2.

Referring to FIG. 2 in combination with FIG. 4, the illustrative system shows a video monitor, either an analog video monitor 211 or a digital video monitor 212, electrically coupled to the video controller 209. The video monitor, either analog video monitor 211 or digital video monitor 212, is a Display Digital Channel (DDC) monitor with an EEPROM that supplies data in the Extended Display Identification Data (EDID) format. As discussed earlier, the video controller is programmed according to the EDID monitor characteristics. This information is initially supplied through a DDC data line 406 and a DDC clock line 405 from the video monitor to the video controller 209 before being read by the processor 203.

Digital signals generated by the video controller 209 are electrically coupled to the digital to differential circuit 220 that converts 18 bits of Red/Green/Blue (RGB) data and 3 bits of Liquid Crystal Display (LCD) timing and control data, for a total of 21 bits of CMOS/TTL data into three LVDS data streams, and a fourth phase-locked transmit clock line. The three data streams and the clock line are then electrically coupled to an analog multiplexer 221. Analog signals received from the video controller 209 are also electrically coupled to the analog multiplexer 221. In the video controller 209, only the digital signals are received by a digital to analog converter.

The analog multiplexer 221 is a high bandwidth, low resistance analog multiplexer. A suitable multiplexer is a P15V330 integrated circuit manufactured by Pericom, Inc.

A standard VGA connector is one type of connector suitable to electrically connect the output signal from the analog multiplexer 221, the DDC clock line 405 the DDC data line 406 to a video monitor, either the analog monitor 211 or the digital monitor 212.

Although FIG. 2 shows the multiplexer 221 and digital to differential circuit 220 as separate from the video controller 209, other embodiments may include both the multiplexer 221 and the digital to differential circuit 220 as part of the video controller 209.

Referring to FIG. 4, a schematic circuit diagram illustrates an analog multiplexer 421 suitable for usage as an interface between either an analog or a digital monitor and the rest of a computer system. The analog multiplexer 421 is coupled to receive both digital and analog signals from the video controller 209. A suitable video controller for use with an embodiment described by the claims is the NM2160, manufactured by NeoMagic Inc. Some video controllers could have both an analog and a digital output and support either or both LVDS and TMDS.

In one embodiment as shown in FIG. 4 in combination with FIG. 2, a select line 408 and an enable line 407 for the analog multiplexer 421 are electrically coupled between the analog multiplexer 421 and a general purpose input/output (GPIO) signal line from the I/O Control 207. The video controller 209 is electrically coupled to either an analog video monitor 211 or a digital video monitor 212 through cabling that transmits both a data line DDCDATA 406 that receives EDID data from the video monitor, (either the analog monitor 211 or the digital monitor 212) and a clock line, DDCCLOCK 405. The EDID data is received by the video controller 209.

As discussed earlier, the video controller 209 and the system processor 203 are electrically coupled through the PCI bus 210, the memory controller 219 and the host bus 208. The EDID data is electrically transmitted to the processor 203 for interpretation. The interpreted EDID data is used to set up the General Purpose input/output lines output from the input/output controller 207 and electrically coupled to the SELECT 408 to select either the analog lines in the multiplexer 209 or the digital to differential lines output from the LVDS interface 420. The interpreted EDID data is used to control the General Purpose input/output lines, and is also used to ENABLE 407 the multiplexer after a type of monitor has been selected. The SELECT 408 and ENABLE 407 lines, in alternate embodiments, could be taken from a suitable video controller.

The digital to differential circuit 220 shown in FIG. 2 is shown in FIG. 4 as LVDS interface 420. In other embodiments, however, the LVDS interface could be replaced by a TMDS interface.

Figure 6:
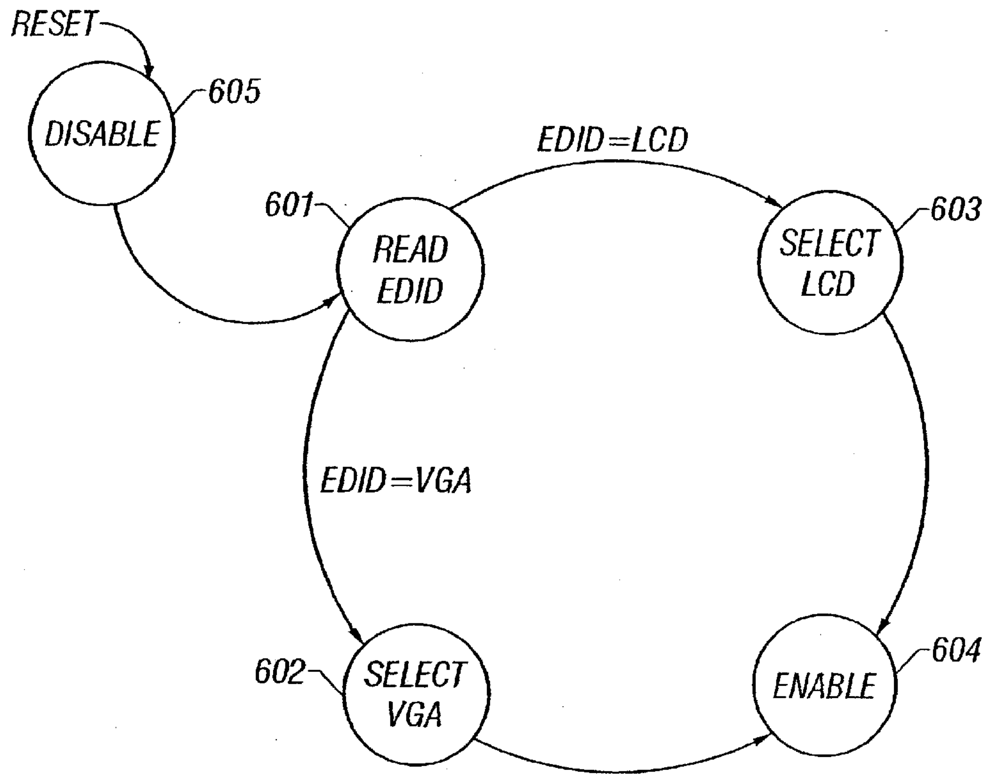
FIG. 6 is a state diagram that illustrates a first suitable method for controlling the interface shown in FIG. 2 to select the type of monitor coupled to the computer system.

Referring to FIG. 6 in combination with FIGS. 2 and 4, a state diagram illustrates a first suitable method for controlling the interface to select the type of monitor coupled to the computer system in a method that is controlled by the video controller 209, the processor 203, and the I/O controller 207. In Step 601, the video controller in cooperation with the processor detects during the POST operation whether a digital or analog video monitor is installed. In the illustrative technique, the display 211 or 212, sends the EDID format information to the system POST program 213 running on the processor 203 via a DDCDATA line 406 through the video controller 209. The processor 203 interfaces with the video controller 209 which is programmed according to monitor characteristics. The processor 203 also interfaces with the I/O controller 207 which selects either an analog signal or a digital signal by selectively performing either step 602 SELECT VGA or step 603 SELECT LCD. Upon selection, the enable line to the analog multiplexer 221 will enable communication of either analog signals or digital signals.

Figure 3:
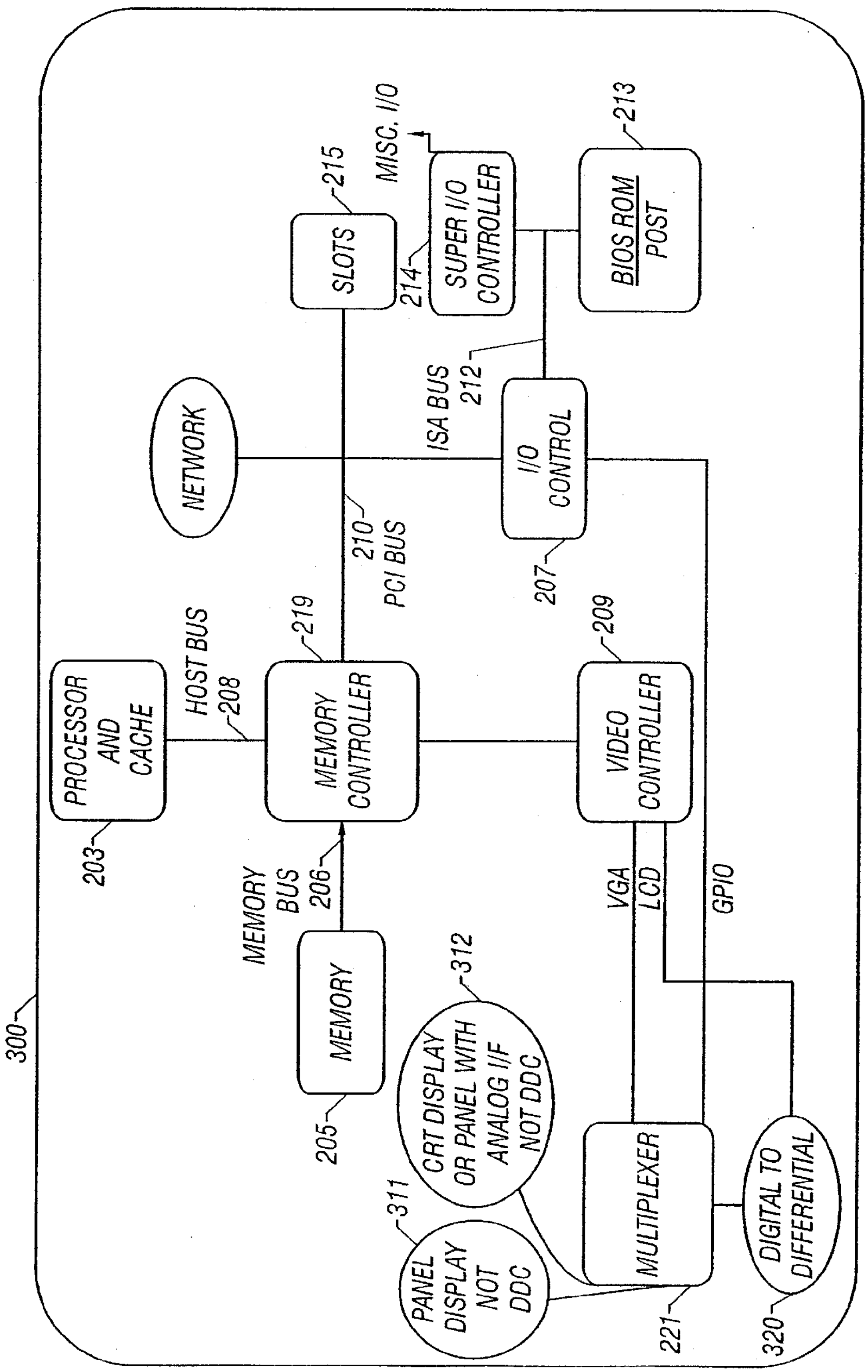
FIG. 3 is a block diagram illustrating a computer system including an interface between either an analog or a digital monitor and the rest of the computer system according to a second embodiment of the present invention.
Figure 5:
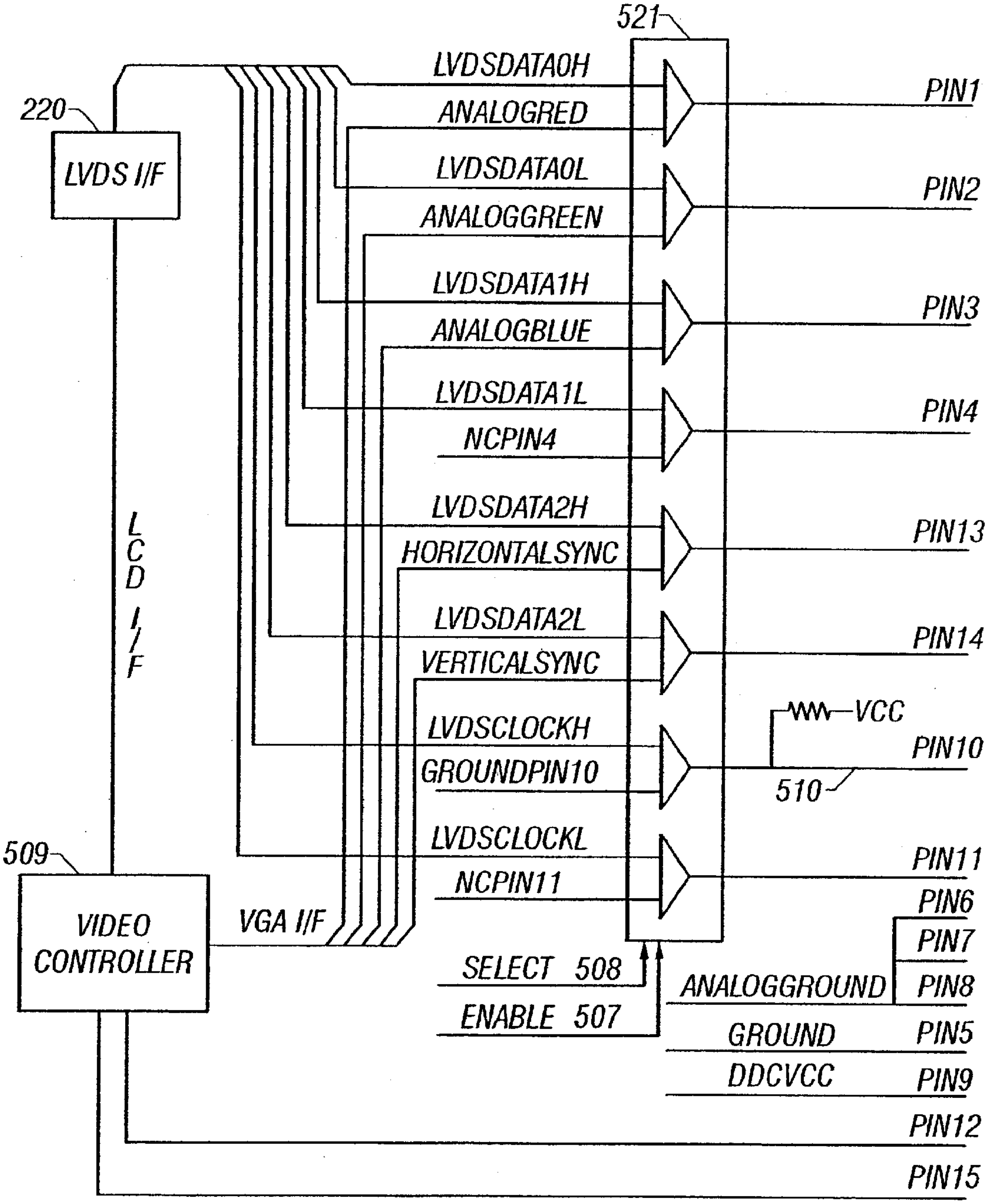
FIG. 5 is a schematic circuit diagram illustrating a circuit suitable for use as an interface between a computer system and either an analog or a digital monitor as shown in FIG. 3.
Figure 7:
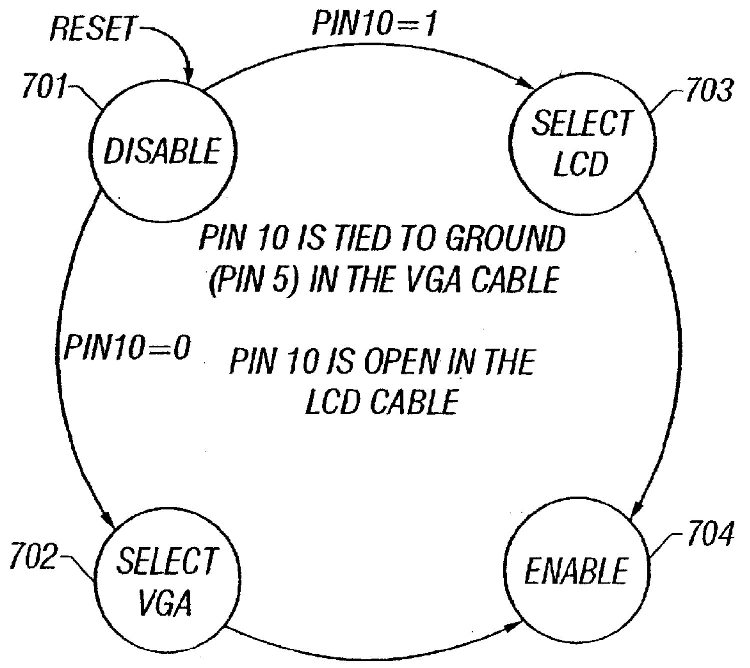
FIG. 7 is a state diagram chart that illustrates a second suitable method for controlling the interface shown in FIG. 3 to select the type of monitor coupled to the computer system.

Referring to FIG. 7 in combination with FIG. 3, a flow chart illustrates a second suitable method for controlling the interface to select the type of monitor coupled to the computer system 300. In the second illustrative method the monitor is a non-DDC monitor. Thus, unlike the first illustrative method, neither the analog video monitor 311 nor the digital video monitor 312 shown in FIG. 3 is a DDC monitor. Referring to FIG. 5 and FIG. 3, the embodiment now under consideration does not use DDCDATA line 406, or DDCCLOCK 405. Instead, as shown in FIG. 5 and in FIG. 7, Pin 10 (labeled 510) of the analog multiplexer 521 shown in FIG. 5 is electrically coupled between the analog multiplexer 521 and either the analog video monitor 311 or the digital video monitor 312. The digital monitor 311 has a cable with Pin 10 (labeled 510) open, and the analog monitor 312 has a cable with Pin 10 (labeled 510) grounded. If the voltage on Pin 10 510 is HIGH, the select line on the analog multiplexer 521 selects a digital interface. If the voltage on Pin 10 510 is LOW, the select line on the analog multiplexer 521 selects an analog interface. Similar to the above-described embodiment, once the select line chooses an analog or a digital interface, the enable line 507 tied to pins in the analog multiplexer 521 enables the selected analog or digital interface.

While the invention has been described with reference to various embodiments, it will be understood that these embodiments are illustrative and that the scope of the invention is not limited to them. Many variations, modifications, additions and improvements of the embodiments described are possible. Variations and modifications of the embodiments disclosed herein may be made based on the description set forth herein, without departing from the scope and spirit of the invention as set forth in the following claims.

What is claimed is:

1. An apparatus comprising:

a video controller operable to generate at least two video signals, the at least two video signals including an analog video signal and a digital video signal;

a connector operable to provide a plurality of pins for attaching a video monitor thereto, the connector operable to receive a monitor identification information from the video monitor on at least one of the pins;

a circuit coupled to the video controller and coupled to the connector, the circuit operable to receive the at least two video signals from the video controller and the monitor identification information from the connector; and the circuit operable to use the monitor identification information to selectively couple one of the at least two video signals to the connector.

2. An apparatus comprising:

a video controller operable to generate at least two video signals, the at least two video signals including an analog video signal and a digital video signal;

a connector operable to provide a plurality of pins for attaching a video monitor thereto;

a circuit coupled to the video controller and coupled to the connector, the circuit operable to receive the at least two video signals from the video controller, wherein the circuit selectively couples one of the at least two video signals to the connector based on the electrical signal of at least one of the connector pins;

one of a multiplexer coupled between the video controller and the connector and a multiplexer incorporated into the video controller and electrically coupled to the connector, the multiplexer comprising:

select lines for selecting one of digital signal data lines, analog signal data lines, and null lines; and a plurality of switches; and one of a digital to differential circuit coupled between the video controller and the multiplexer and a digital to differential circuit incorporated into the video controller and electrically coupled to the multiplexer.

3. The apparatus of claim 1 wherein the video monitor is selected from a group comprising:

a DDC monitor;

a DDC compatible monitor; and a monitor compatible for use with a DDC emulator.

4. The apparatus of claim 1 wherein the video controller comprises:

a digital to analog converter;

a memory;

an imaging circuit; and a display refresh circuit.

5. An apparatus comprising:

a switch;

a first input terminal coupled to the switch for receiving an analog signal;

a second input terminal coupled to the switch for receiving a differential digital signal;

an output terminal coupled to the switch, the switch for multiplexing the analog signal and the differential digital signal, and the output terminal for supplying a multiplexed signal to a video monitor; and a video controller communicatively coupled to the switch, the video controller operable to receive monitor identification information from the video monitor to control whether the analog signal or the differential digital signal is supplied as the multiplexed signal.

6. The apparatus of claim 5 further comprising a multiplexer having a select line coupled to a general purpose input/output line.

7. The apparatus of claim 5 further comprising a multiplexer having a select line coupled to the video controller.

8. The apparatus of claim 7 further comprising:

a digital to differential circuit that receives a digital video signal from the video controller and outputs the differential digital signal to the multiplexer.

9. The apparatus of claim 7 further comprising:

a digital to analog converter that receives a digital video signal from the video controller and sends an analog video signal to the multiplexer.

10. The apparatus of claim 7 wherein the multiplexer is connected to a connector coupled between the video monitor and the multiplexer.

11. The apparatus of claim 10 wherein the video monitor is selected from a group comprising:

a digital video monitor; and an analog video monitor.

12. The apparatus of claim 11 wherein the video monitor is a Display Data Channel (DDC) monitor including a DDC clock line and a DDC data line.

13. The apparatus of claim 12 wherein the DDC clock line and the DDC data line are coupled to the video controller.

14. The apparatus of claim 13 wherein the video controller reads the DDC data line in the format of Extended Display Identification Data (EDID), and outputs one of an electrical signal indicating a digital code to the apparatus as the select line and an electrical signal indicating an analog code to the apparatus as the select line.

15. The apparatus of claim 11 wherein the select line of the multiplexer tests the voltage on an electrical line between the multiplexer and the connector to determine whether or not the video signal is analog or digital.

16. A computer system comprising:

a processor operable to couple to a controller through a bus;

a video monitor coupled to the processor through the controller via the bus;

the controller operable to generate at least two video signals, the at least two video signal including an analog video signal and digital video signal;

a circuit coupled to the controller and coupled to the video monitor, the circuit operable to receive the at least two video signals from the controller; and the circuit receives monitor identification information from the video monitor via the bus to selectively couple one of the at least two video signals.

17. The computer system of claim 16 wherein the controller is a video controller.

18. A computer system comprising:

a processor operable to couple to a video controller through a bus;

a video monitor coupled to the processor through the video controller via the bus;

the video controller operable to generate at least two video signals, the at least two video signal including an analog video signal and digital video signal;

a circuit coupled to the video controller and coupled to the video monitor, the circuit operable to receive the at least two video signals from the video controller, wherein the circuit selectively couples one of the at least two video signals to the connector based on information received from the video monitor via the bus;

the circuit includes a multiplexer coupled between the video controller and the connector, the multiplexer comprising:

select lines for selecting one of digital signal data lines, analog signal data lines, and null lines; and a plurality of low resistance, high bandwidth analog switches;

a digital to differential circuit coupled between the video controller and the multiplexer; and a digital to analog converter coupled between the video controller and the multiplexer.

19. The computer system of claim 17 wherein the video controller is selected from the group consisting of a text display adapter, a graphics adapter, a 3-D graphics adapter, a SVGA display adapter, an XGA adapter, a display adapter supporting VESA graphics standards, a CGA adapter, and an adapter supporting Hercules graphics standards.

20. The computer system of claim 17 wherein the video monitor is one of a digital video monitor and an analog video monitor.

21. The computer system of claim 17 wherein a multiplexer receives both a digital and an analog video signal and sends one of a digital and analog video signal to the connector coupled between the multiplexer and the video monitor.

22. A method for multiplexing an analog signal and a digital signal, the method comprising:

receiving an analog signal from a video controller at a multiplexer;

receiving a digital signal from the video controller at the multiplexer;

receiving monitor identification information from a video monitor at the multiplexer;

in response to receiving the monitor identification information, automatically determining whether the video monitor uses the digital signal or the analog signal; and in response to determining, automatically connecting either the digital signal or the analog signal to the video monitor.

23. The method of claim 22 wherein the digital signal is one of a Low Voltage Differential Signaling (LVDS) interface and a Transition Minimized Differential Signaling (TMDS) interface.

* * * * *